United States Patent [19]

Bergmann et al.

[11] Patent Number: 5,323,955
[45] Date of Patent: Jun. 28, 1994

[54] EXPLOSIVELY BONDING METAL COMPOSITE

[75] Inventors: Oswald R. Bergmann, Wilmington, Del.; Vinci M. Felix, Kennett Square, Pa.; Walter J. Simmons, Martinsburg, W. Va.; Richard H. Tietjen, Jeannette, Pa.

[73] Assignee: E. I. Du Pont de Nemours and Company, Wilmington, Del.

[21] Appl. No.: 23,762

[22] Filed: Feb. 26, 1993

Related U.S. Application Data

[62] Division of Ser. No. 837,177, Feb. 14, 1992, Pat. No. 5,226,579.

[51] Int. Cl.⁵ .................. B23K 103/08; B32B 15/00; C25D 5/10
[52] U.S. Cl. .................. 228/262.7; 228/107; 428/663; 428/940
[58] Field of Search .................. 228/107, 263.19, 25, 228/190; 428/660, 663, 665, 614, 940

[56] References Cited

U.S. PATENT DOCUMENTS

| | | | |
|---|---|---|---|
| 3,125,804 | 3/1964 | Thome | 228/232 |
| 3,137,937 | 6/1964 | Cowan et al. | 29/486 |
| 3,205,574 | 9/1965 | Brennecke | 29/494 |
| 3,233,312 | 2/1966 | Cowan et al. | 29/194 |
| 3,238,071 | 3/1966 | Holtzman et al. | 148/11.5 |
| 3,258,841 | 7/1966 | Popoff | 29/486 |
| 3,263,324 | 8/1966 | Popoff | 29/486 |
| 3,264,731 | 8/1966 | Chudzik | 29/486 |
| 3,281,930 | 10/1963 | Fordham | 29/470.1 |
| 3,397,045 | 8/1968 | Winter | 29/191 |
| 3,397,444 | 8/1968 | Bergmann et al. | 29/470.1 |
| 3,449,545 | 6/1969 | Petitt | 228/232 |
| 3,493,353 | 2/1970 | Bergmann et al. | 29/191 |
| 3,563,713 | 2/1971 | Rudd | 228/232 |
| 4,264,029 | 4/1981 | Henne et al. | 228/108 |
| 4,612,259 | 9/1986 | Ueda | 228/107 |
| 4,967,024 | 10/1990 | Gumprecht et al. | 570/168 |

FOREIGN PATENT DOCUMENTS

| | | |
|---|---|---|
| 0008068 | 2/1980 | European Pat. Off. |
| 0056074 | 7/1982 | European Pat. Off. |
| 1934104 | 1/1971 | Fed. Rep. of Germany |
| 41688 | 3/1983 | Japan |
| 2106817 | 4/1983 | United Kingdom |

OTHER PUBLICATIONS

European Search Report.
Patent Abstracts of Japan, Group No. M470, vol. 10, No. 100, (JP-60-234781) Abstract Publication Date Apr. 16, 1986.
Du Pont Detaclad® explosion-bonded clad metals, Problem-Solving Materials for Industry.

*Primary Examiner*—Samuel M. Heinrich
*Attorney, Agent, or Firm*—Michael K. Boyer

[57] ABSTRACT

A process for using explosion bonding to produce a metal composite that has substantially diffusionless metallurgical bonds between the layers. In one aspect, the composite comprises a plurality of cladding layers bonded to a backer plate such that the seam between the layers is sealed.

11 Claims, 4 Drawing Sheets

EXPLOSIVELY BONDING METAL COMPOSITE

This is a division of U.S. application Ser. No. 07/837,177, filed Feb. 14, 1992, now U.S. Pat. No. 5,226,579.

FIELD OF THE INVENTION

The present invention relates to metallic composites and processes for preparing the same by explosion bonding.

BACKGROUND OF THE INVENTION

Conventional reaction vessels for manufacturing fluorocarbons are fabricated from one or more of Hastelloy, carbon steel, stainless steel or polychlorotrifluoroethylene resins. Commercial manufacture of a fluorocarbons creates an extremely corrosive environment. While the corrosion resistance of Hastelloy alloys containing nickel, cobalt, chromium, molybdenum, etc., is superior to stainless steel, it also corrodes at an undesirable rate, particularly when exposed to a high perfluorinated catalyst concentration. The polychlorotrifluoroethylene resins and similar highly fluorinated resins are not suitable because such resins have relatively poor heat transfer, low strength, and faulty adhesion to supporting base metal surfaces.

The conventional cost of materials for fabricating a reaction vessel on a commercial scale, from precious metals, i.e., noble metals such as ruthenium, osmium, rhodium, iridium, palladium, platinum, silver, and gold, is typically not cost-effective. High value metals such as rhenium, typically are also not cost-effective for use in fabricating a reaction vessel. Further, refractory metals, i.e., high melting point metals, such as hafnium, molybdenum, tungsten, ruthenium, osmium, iridium, and alloys thereof, are often brittle at room temperature which prevents these metals from being readily fabricated into a reaction vessel for manufacturing a fluorocarbon. While refractory metals have desirable properties such as corrosion resistance, high melting point, among others., these metals typically lack characteristics such as ductility which are required for materials used for fabricating a reaction vessel.

Explosion bonding is conventionally used for obtaining a reaction vessel. However, conventional explosion bonding techniques are limited to using those metals possessing room temperature ductility and impact strength. Metals lacking such ductility tend to crack during explosion bonding.

Conventional explosion bonding techniques also require multiple cladding shots in order to obtain (1) a clad or composite having more than one cladding plate on the same backer or base, and (2) a completely sealed and metallurgically bonded seam between adjacent clad plates on the same backer. Further, the dimensions of the resultant composite are typically limited to the dimensions of commercially available metal sheets.

SUMMARY OF THE INVENTION

The present invention improves conventional explosive bonding processes thereby permitting use of metals which are brittle at ambient or room temperature, and metals which are only commercially available in dimensions that are smaller than the areal extent of the desired composite on a backer plate.

The invention provides a process for metallurgically bonding a plurality of adjacent metal layers, which are initially separated, by propelling the layers together with a single explosive charge in one shooting operation. At least one of the layers being explosively clad is a brittle metal which has a relatively low ductility at room temperature. The ductility of the brittle metal is improved, prior to the detonation of the explosive, by heating the layer(s) to a temperature at which the layer is sufficiently ductile to be explosively bonded.

Another aspect of this invention relates to improving the explosive bonding process whereby metal plates which are available only in narrow widths or short lengths, e.g., precious metals, can be formed into relatively large composites using a one step process. In this aspect of the invention, a plurality of adjacent metal layers are bonded to the backer metal by propelling the layers with one explosive charge in one shot, wherein at least one of the layers comprises a plurality of adjacent plates. Such plates are typically arranged by assembling the narrow or short plates in a parallel manner to form a monolayer. If desired, the seams between the short lengths of metal can be metallurgically sealed during the explosion bonding by using a "batten strap" which is also simultaneously bonded to the two monolayers.

DETAILED DESCRIPTION OF THE INVENTION

Figure 1:
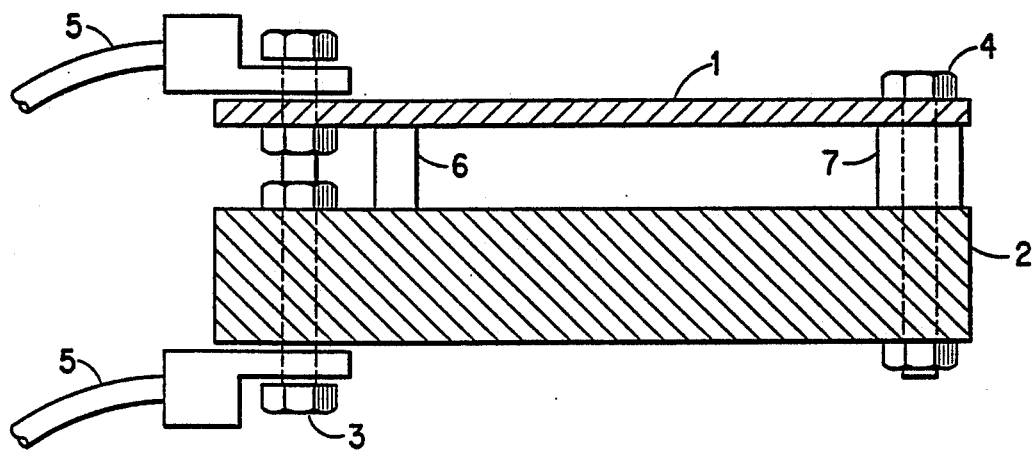
FIG. 1—FIG. 1 is a side view of an assembly for producing a composite wherein a backer layer and a cladding layer are heated by passing an electrical current through both layers.

The present invention fills the need for composites which contain corrosion resistant refractory metals, precious metals and alloys thereof, that are used for producing equipment, e.g., a reaction vessel, which is used in manufacturing alternative or replacement fluorocarbon compounds. The alternative or replacement fluorocarbons, known as hydrochlorofluorocarbons (HCFC), and hydrofluorocarbons (HFC), have a lower ozone depleting potential than conventional chlorofluorocarbon (CFC) compounds. Suitable techniques for manufacturing the replacement HCFC and HFC compounds are disclosed in U.S. Pat. Nos. 4,258,225 and 4,967,024, which are hereby incorporated by reference. Such manufacturing techniques require using hydrogen fluoride in combination with highly acidic, corrosive and erosive perfluorinated catalysts, such as tantalum pentafluoride (TaF5), niobium pentafluoride (NbF5), among others. These manufacturing techniques create an environment which is extremely acidic and corrodes conventional manufacturing equipment. The by-products of the corrosion process are released into the manufacturing process, thereby contaminating the resultant fluorocarbon, poisoning the perfluorinated catalyst, and causing undesired side-reactions. The present invention provides a method for fabricating composites containing corrosion resistant metals which can be used for producing equipment that is corrosion resistant and which ameliorates, if not eliminates, the contamination associated with conventional manufacturing equipment.

The composites are obtained by explosion bonding a corrosion resistant metal or alloy thereof to a base or backer metal. The invention provides improved explosive bonding processes whereby composites containing corrosion resistant metals can be formed on a commercial scale.

During manufacture of the fluorocarbon, the corrosion resistant surface of the composite contacts the corrosive environment associated with manufacturing the fluorocarbon. The corrosion resistant surface of the composite protects the remainder of the composite from attack by the corrosive environment.

"Metal" is intended to refer to both pure metals and metal alloys.

"Composite" is intended to refer to a plurality of layers of the same or chemically different metals which have been metallurgically bonded by explosively bonding or cladding to form an integral structure. Metal composites are also referred to as clads. Explosion bonding metals layers together to form a composite is also referred to as cladding. By prudently selecting two or more metal layers which are chemically similar or dissimilar, and bonding these into an integral metallurgical composite, a composite can be tailored for use in a wide range of applications.

"Batten strap" is intended to refer to a strip of metal which is used for sealing the seam between two or more corrosion resistant metals. The batten strap typically comprises a corrosion resistant metal.

"Brittle metal" is intended to refer to a metal having a high brittle-to-ductile transition temperature, and/or low ductility at room temperature. Brittle metals tend to crack during the transient bending and high rate of plastic deformation induced by explosion bonding at ambient temperature. Brittle metals typically possess a ductile-to brittle transition temperature of about 40° F. or higher.

"Corrosion resistant" is intended to refer generally to chemical resistance, but may also include abrasion/erosion resistance.

"Corrosion resistant metal" is intended to refer generally to metals which are resistant to the corrosive environment associated with manufacturing the alternative fluorocarbons. Examples of corrosion resistant metals comprise refractory metals such as at least one of molybdenum, rhenium, among others. At least one corrosion resistant metal can be clad onto a base metal in order to form a composite.

"Base metal" is intended to refer to metals on which the corrosion resistant metals are explosively clad. Examples of base metals comprise at least one of carbon steel, stainless steel, alloy steels, aluminum, among others. In the case of one-sided clads, generally the base metal is the backer layer onto which the corrosion resistant metals are clad. For two-sided clads or composites, each face of the base or backer metal is clad with the same or chemically different corrosion resistant metals.

"Reaction vessel", "vessel", "reactor", or "equipment" is intended to refer to any article of manufacture which is fabricated from one or more composites. Composites may be used for fabricating equipment such as autoclaves, pressure vessels, reactors, dissolvers, heat exchangers, crystallizers, radiation-resistance piping, form plates, heads, tube sheets, tube-sheet shells, and structural, electrical, tubular transition joints, among others.

"Stand-off" is intended to refer to any suitable means for spacing the corrosion resistant metal away from the base metal. The spacing defined by the stand-off permits the metal being propelled by the explosion to obtain a velocity which is sufficient for the metals being clad to form a substantially diffusionless, metallurgical bond. A suitable stand-off comprises a relatively thin-walled stainless steel tube or any other means which is capable of spacing the corrosion resistant metal from the base metal. The spacing formed by the standoff typically ranges from about 0.010 to 0.800 inches, i.e., the specific spacing is dependent upon the amount and type of explosive, and the thickness and composition of the metals being bonded. The techniques for determining the appropriate spacing are well-known, and discussed in U.S. Pat. Nos. 3,397,444 & 3,493,353, which are incorporated by reference. Any suitable conventional device may be used for initiating the explosion. Examples of suitable initiation devices are disclosed in U.S. Pat. No. 3,554,126, which is incorporated by reference.

The invention is capable of producing composites which have a wide range of sizes and characteristics. A layer in the composite may be comprised of a plurality of relatively thin and discrete layers. Typically, a cladding layer in the composite has a thickness which ranges from about 0.010 to about 0.250 inches, whereas the backer layer ranges from 0.250 to several inches thick.

The composite has at least two layers and in some cases an intermediate layer may be provided which is located between the corrosion resistant metal and the base metal. A suitable intermediate layer may comprise at least one member of the group of copper, silver, tantalum, Hastelloy, among others. The thickness of the intermediate layer typically ranges from about 0.010 to 0.150 inches. For example, a copper intermediate layer(s) may be used for dissipating and distributing heat should the composites be further processed, e.g., joining two composites together by welding. Further, the welded joints, which are formed during manufacture of a chemical reactor, may be susceptible to the corrosive environment of the fluorocarbon manufacturing process. In these cases, a Hastelloy intermediate layer(s), e.g., a nickel based alloy such as Hastelloy C-276, may be used as a secondary corrosion resistant layer.

One aspect of the invention relates to a process for incorporating brittle corrosion resistant metals into composites. Metals, such as molybdenum, tungsten, among others and certain alloys thereof have a relatively high brittle-to-ductile transition temperature. As a result, these metals typically lack sufficient ductility, at room temperature, to withstand the plastic deformation which is induced during the explosion bonding process, i.e., explosion bonding at room temperature typically causes these metals to crack. The invention overcomes the problems associated with explosion bonding brittle metals by heating the brittle metal to a temperature sufficient to increase the ductility thereof which permits forming a substantially crackfree and diffusionless metallurgical bond. For example, the metallurgical bond is achieved by propelling the layers together with an explosive wherein at least one of brittle layers has been heated and becomes ductile prior to the detonation of the explosive. After having been heated, the layers can withstand the significant plastic deformation induced by the explosive to form a composite with at least about 75% areal bonding which can be further processed while avoiding de-bonding or cracking. Moreover, the heating methods of the invention rapidly heat the desired metal layers to a ductile temperature while maintaining the safe functioning of the explosive charge, detonator, and primer.

Should the degree of areal bonding be less than that desired, the regions of the composite which lack a satisfactory bond may be removed. For example, the edge portions of a composite which are unsatisfactorily bonded may be removed by trimming, cutting, grinding, among others, thereby providing a useful composite. In some cases, it may be desirable to produce oversized composites in order to compensate for material loss which may be associated with subsequent processing of the composite.

While brittle metals such as molybdenum, tungsten, individually have high brittle-to-ductile transition temperatures, certain alloys of these brittle metals may be sufficiently ductile to permit satisfactory bonding by explosive bonding at ambient temperature with little or no heating. For example little, if any, heating is necessary for producing acceptable composites from an alloy comprising molybdenum with about 41% rhenium. Therefore, using certain corrosion resistant metal alloys permits reducing the degree of heating which may be necessary to render the alloy sufficiently ductile to be used in an explosion bonding process.

Another aspect of this invention provides a one-step process for explosion bonding whereby metal plates which are available only in narrow widths or short lengths can be formed into relatively large-size composites. Such metal plates include molybdenum, tungsten, rhenium, ruthenium, palladium, platinum, silver, gold, among others and alloys thereof. In this aspect of the invention, a plurality of adjacent metal layers are bonded to a backer by propelling the layers together with an explosive wherein at least one of the layers comprises a plurality of adjacent plates. Such plates can be arranged by assembling the plates in a parallel manner to form a monolayer. The seams between the plates can be metallurgically sealed during the explosion bonding. The process optionally further comprises sealing the seam(s) between the plates of the monolayer, by locating one or more metal batten straps between, e.g., above, the seams, which simultaneously seal the seams and become bonded to the composite during the explosion. The batten straps are typically corrosion resistant metals such as rhenium, platinum, molybdenum, gold, alloys thereof, among others.

The two aspects of the invention discussed above may be performed separately and/or combined together and operated as an integral process. For example, a monolayer comprising a plurality of metal plates may be heated prior to being explosively bonded to a base metal.

For best results, prior to explosion bonding, at least the metal layer with a high brittle-to-ductile transition temperature is heated to a temperature at least about 5% greater than its brittle-to-ductile transition temperature and less than the melting point of the metal. The brittle metal may be heated by any suitable technique which does not prematurely detonate the explosive. Examples of suitable heating techniques comprise at least one of using direct or indirect electric resistance heating of the brittle metal, heating elements or lasers, or conventional methods such as convection, conductive, induction and radiative heating, among others. For example, a molybdenum alloy which has a brittle-to-ductile transition temperature of about 100° F., may be heated to a temperature of about 300° F., prior to detonation of the explosive, thereby resulting in the formation of a composite that has an acceptable metallurgical bond between the molybdenum and adjacent layer. The heating rate and the length of time the brittle metal is maintained above the brittle-to-ductile temperature are not critical for practicing the invention.

As discussed above, the metal layer(s) having a high brittle-to-ductile transition temperature can be heated by using a direct and/or an indirect method. In order to more fully explain the methods which may be used for heating the brittle metal, reference is made to the attached drawings. For clarity, the heating methods are illustrated by assemblies which consist of two layers; however, composites having more than two layers may be obtained by practicing the invention. The top layer of the assembly is termed the cladding layer and comprises a corrosion resistant metal which has a high brittle-to-ductile transition temperature. The cladding layer is at least partially covered by an explosive charge (not shown). The backer layer or base metal is shown as being located on the bottom of the assembly, and normally the backer layer is the component of the assembly which is the furthest from the explosive.

Referring now to the drawings, FIGS. 1-5 show assemblies that may be used for practicing the invention in which heating is accomplished by electric resistance heating. For example, heat is generated by conducting an electrical current, e.g., via a transformer, through at least one layer of the assembly. As a result, the layer or layers through which the current is conducted acts as an in-situ heating element. The current flow is maintained until the layer which has a high brittle-to-ductile transition temperature is rendered sufficiently ductile for explosion bonding.

FIG. 1 is a side view of an assembly wherein the backer or base layer and a cladding layer are heated by passing a current through both layers. In FIG. 1, the cladding layer is indicated by 1. The layer 1 is bolted to the backer layer 2, by bolts 3 and 4. At least two copper wires 5 which are suitable for carrying an electrical current, are connected at one end to a transformer (not shown), and at the other end to the ends of bolt 3. Standoffs 6 and 7 contact and separate the two layers prior to detonation of the explosive. Standoff 7 has a lower electrical resistance than standoff 6; thus, the current path is through the cladding and to the backer layers.

In this aspect of the invention, the cladding layer is heated directly, thereby obviating the use of separate heating elements. Upon detonation of the explosive, the ends of wires 5 are damaged and usually ruined. Because the wires are connected at only one end of the assembly, this method for heating is desirable for producing composites larger than about 4×8 feet. Further, directly heating the metal layers reduces the amount of time necessary for reaching a temperature at which the brittle metal becomes ductile. The temperature to which the assembly is heated and the time necessary to reach this temperature depends on at least one of (1) the amount and rate of current passing through a particular layer, (2) composition of the layer, and; (3) surrounding environment, e.g., air currents.

Figure 2:
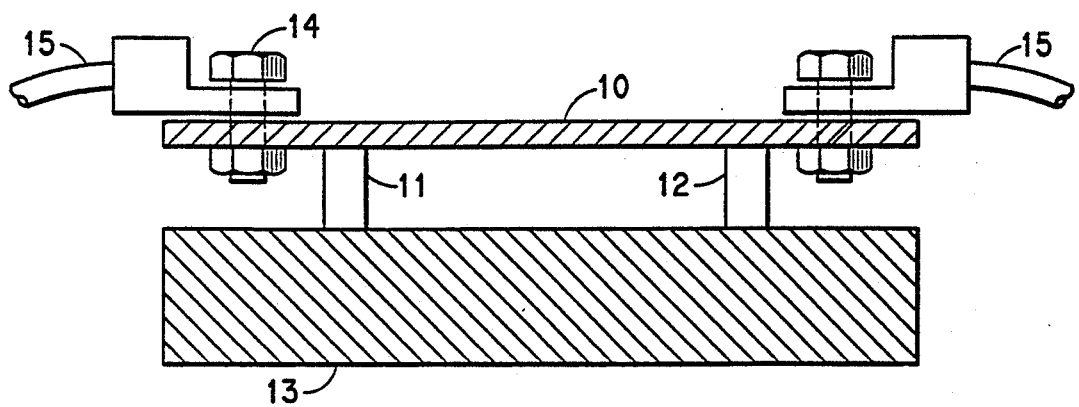
FIG. 2—FIG. 2 is a side view of an assembly for producing a composite wherein an electrical current is passed only through the cladding layer.

FIG. 2 is a side view of an assembly wherein a current is passed only through the cladding layer. In FIG. 2, the cladding layer 10 is supported by standoffs 11 and 12, above the backer layer 13. Bolts 14 are located along the longitudinal edges of the cladding layer and connected to wires 15 that are attached to a transformer (not shown). Similar to the above discussion regarding FIG. 1, the cladding layer is heated directly, thereby reducing the amount of time necessary for reaching the ductile state of this metal.

Figure 3:
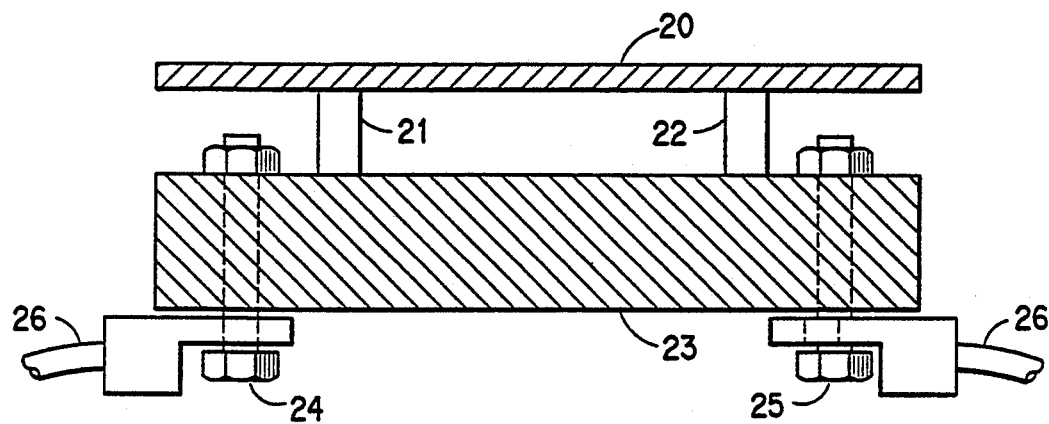
FIG. 3—FIG. 3 is a side view of an assembly for producing a composite wherein an electrical current is passed only through the backer layer, thereby indirectly heating the cladding layer.

FIG. 3 is a side view of an assembly wherein an electric current is passed only through the backer layer, thereby indirectly heating the cladding layer. In FIG. 3, the cladding layer 20 is supported by standoffs 21 and 22 above the backer layer 23. Bolts 24 and 25 are located along the longitudinal edges of the backer layer 23, and connected to wires 26 which are attached to a transformer (not shown). In this assembly the backer layer functions as a heating element for the cladding layer. Unlike the assemblies shown in FIGS. 1 and 2, the amount of time necessary for reaching the ductile state of the cladding layer is limited by the rate of heat transfer from the hot backer layer to the adjacent cladding layer.

Figure 4:
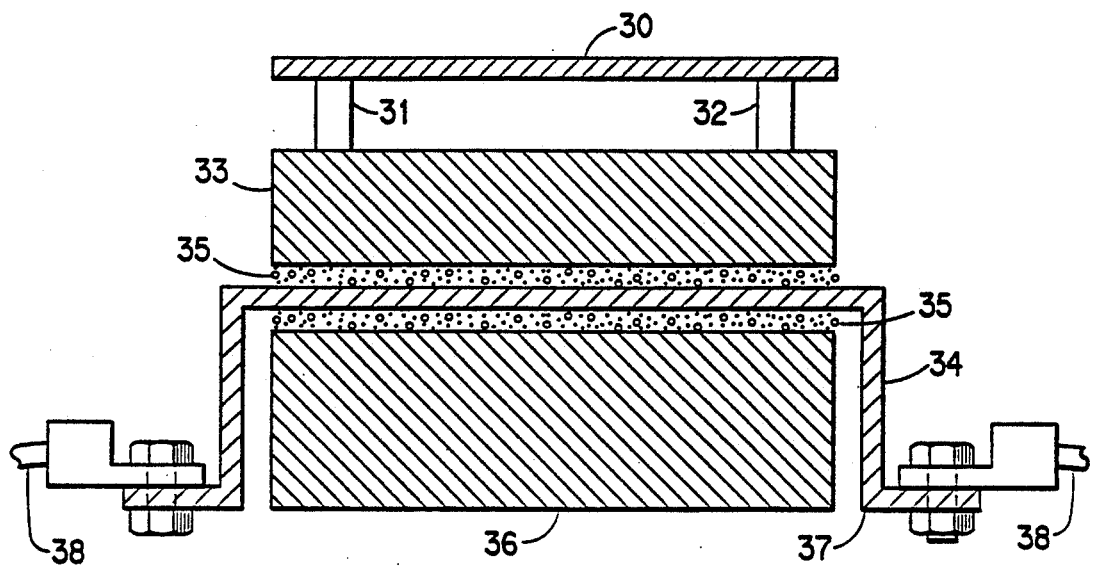
FIG. 4—FIG. 4 is a side view of an assembly for producing a composite wherein a layer, which will not form a part of the resultant composite, is heated by passing an electrical current through it, thereby indirectly heating the backer and cladding layers.

FIG. 4 is a side view of an assembly wherein a heating element which is not a component of the formed composite is heated by passing an electrical current through the heating element, thereby indirectly heating the backer and cladding layers. In FIG. 4, cladding layer 30 is supported by standoffs 31 and 32 above the backer layer 33. The backer plate 33 is supported by a stainless steel plate or heating element 34. Backer plate 33 is insulated from heating element 34 by a layer of silica sand 35. Beneath heating element 34, a support plate 36 is located which is also insulated from the heating element by a layer of silica sand 35. Thin layers of sand may be used for providing electrical insulation among the heating element, and support and backer plates. The sand also prevents the stainless steel heating plate 34 from bonding to either the support or backer plates. The support plate 36, beneath the stainless steel heating plate, is optionally used only when necessary for reducing bending or warping in the final composite. For example, should the weight supported by the backer layer be sufficient to cause downward bowing or warping of the backer layer, the resultant composite will also be bowed or warped. The portion of the stainless steel heating element 34 which is adjacent to the backer layer is longer and wider than the cladding or backer layers. The heating element also includes an offset 37 which limits the damage to wires 38 caused by detonation of the explosive.

Similar to the discussion given above in connection with the assembly shown in FIG. 3, the amount of time necessary for reaching the ductile state of the cladding layer is limited by the heat transfer rate. The assembly illustrated in FIG. 4 is normally used when producing a relatively small composite, i.e., a composite smaller than about 4×8 feet.

The electrical current flow rate and the distance between the components of this assembly should be controlled so as to prevent formation of vibrations, e.g., about 60 Hz, which can be caused by magnetic forces. Excessive vibrations could adversely alter the positioning of the standoffs thereby producing a substandard composite, e.g., a mis-aligned or warped composite.

For best results, the assemblies illustrated in FIGS. 1-4, are placed within a plywood frame, which is enclosed within a plywood box, before detonating the explosive. Enclosing the assembly within a plywood box, minimizes the cooling effect that may be caused by air circulating around the heated plates. An enclosure such as a plywood box also contains or minimizes the effects upon the environment surrounding the explosion.

Figure 5:
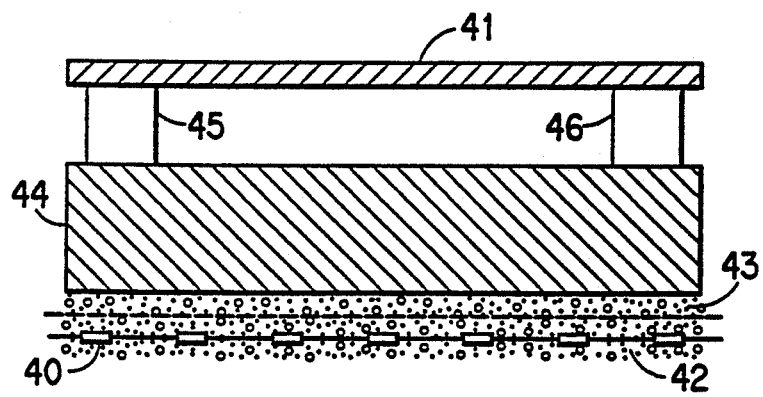
FIG. 5—FIG. 5 is a side view of an assembly for producing a composite wherein the backer layer is heated by the heating elements from a household oven, thereby indirectly heating the cladding layer.

The side view of the assembly shown in FIG. 5 is a variation of the assembly shown in FIG. 4 in which a plurality of individual heating elements 40 are substituted for the stainless steel plate. FIG. 5 shows an assembly in which a cladding layer 41 is indirectly heated. Cladding layer 41 is held above backer plate 44 by standoffs 45 and 46. Individual heating elements 40 are connected electrically in a parallel arrangement. The heating elements are physically identical to the elements which are conventionally used in house-hold ovens. The heating elements are embedded within a layer of silica sand 42. Another layer of sand 43 which functions as an insulator is placed between the heating elements 40 and the backer plate 44.

The explosive which is used for propelling the cladding layer towards the backer layer thereby bonding the layers together, is typically located upon the upper surface of the cladding layer. However, if desired the orientation of the cladding and backer layer shown in FIGS. 1-5 may be reversed, i.e., propelling the backer plate toward the cladding layer. Details regarding use of primers, positioning and amount of explosive, detonation properties of the explosion, detonation thereof, as well as choice of appropriate stand-offs are well known to those in the art, and may be found in U.S. Pat. Nos. 3,205,574, 3,233,312, 3,264,731 and 3,493,353, 3,397,444 3,554,126, which are hereby incorporated by reference.

In some cases it may be desirable to locate a driver plate within the assembly between the explosive and the cladding layer. The driver plate functions to force the cladding metal into the base layer thereby metallurgically bonding the clad and base layers together. In other words, the driver plate conducts or translates the pressure wave from the explosive to the cladding layer. A driver plate is particularly desirable when bonding a plurality of cladding layers to an intermediate and/or base metal. For example, when forming a composite having a cladding monolayer comprising a plurality of adjacent metal plates, the driver plate enhances the surface uniformity of the resultant composite, i.e., the driver plate tends to prevent one or more plates from misaligning or warping during the explosion. In many cases, the driver plate is temporary or expendable and for this reason is usually attached to the underlying prime metal with glue, cloth tape, and/or plastic tape. The glue, tape, etc., serves to provide adequate physical contact between the driver plate and the cladding layer during the explosion, while preventing the driver plate from being permanently bonded to the underlying metal(s).

Figure 6:
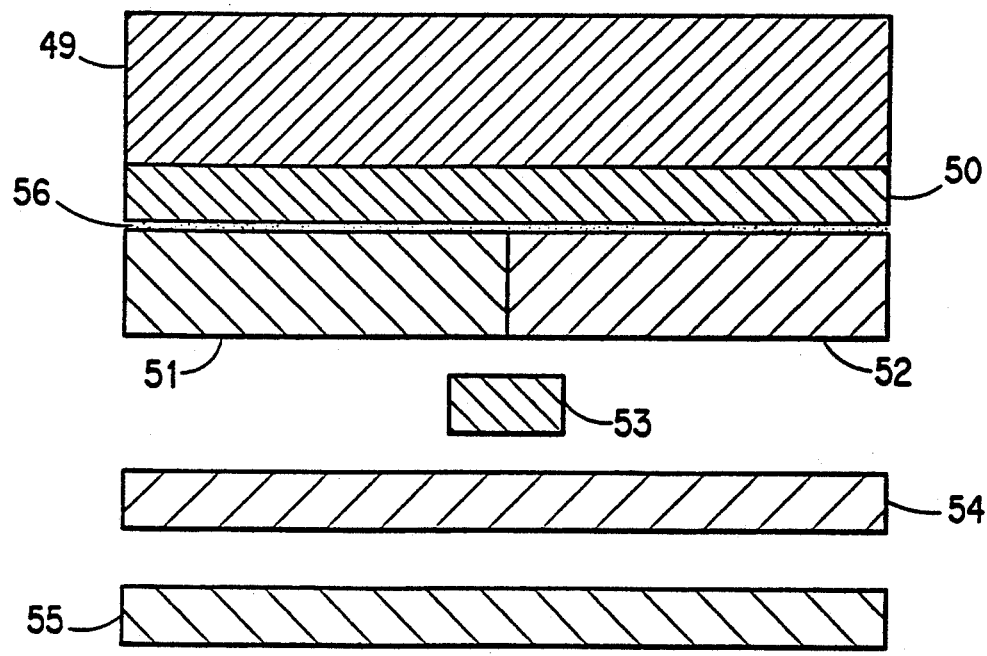
FIG. 6—FIG. 6 is a side view of an assembly for producing a composite which bonds two cladding plates to an intermediate layer and that in turn is bonded to a larger backer metal layer.

Referring now to FIG. 6, is a side view of an assembly for joining two prime metal plates to an optional interlayer, sealing the seam therebetween, and joining the interlayer to the backer layer. Referring now to FIG. 6, an ANFO-based explosive that contains an inert diluent 49, is located above driver plate 50 which in turn is situated above two parallel cladding plates 51 and 52. A layer of double-stick tape 56 is affixed between driver plate 50 and cladding plates 51 and 52. The seam between the cladding plates 51 and 52 is sealed by batten strap 53. An optional, for example, copper intermediate layer 54 is located between the sealed cladding strips (51 and 52), and the backer or base layer 55.

Certain aspects of the invention are demonstrated by the following examples. It is to be understood that these examples are provided to illustrate and not limit the scope of the appended claims. Unless specified otherwise, the materials which were used in the following Examples are commercially available.

EXAMPLE 1

A composite was formed in this Example by using the assembly that is illustrated in FIG. 4.

A 13/16 inch thick SA537, Class 2 steel plate, about 12 inches by 24 inches was placed on a stainless steel plate with a thin layer of sand therebetween. The stainless steel plate was supported by a 1 inch steel plate separated therefrom by a layer of sand. A copper plate measuring about 12 inches by 24 inches by 1/16 inch was placed above the stainless steel plate and spaced therefrom a distance of about 0.200 inch by 6 stainless steel tube standoffs. The standoffs were arranged about the perimeter of the SA537, Class 2 steel plate in a manner which aligned the copper plate with the stainless steel plate. A molybdenum plate measuring about 12 inch by 24 inches by 1/16 inch thick was placed above the copper plate and spaced therefrom a distance of about 0.125 inch, by 6 stainless steel tube standoffs which were arranged equally-spaced about the perimeter of the copper plate. The outer layer of the molybdenum plate was covered with a layer of masking tape as a guard against marring the final surface by the explosive.

A dimensionally conforming layer of the explosive which had a weight of about 9 pounds per square foot was placed over the layer of masking tape.

The explosive was a low detonation velocity powdered explosive composition comprising ammonium nitrate, fuel oil, and density modifiers which produced a detonation velocity of about 2450 meters per second. A detonator was centered on the edge of the shortest dimension of the molybdenum plate and in contact with the explosive. The detonator was a commercially available electric detonator known as "E-1A #6". Initiation of the explosive was accomplished by using a primer held above the cladding layer within a Lucite disk 2 inches in diameter. The primer was comprised of cast TNT wrapped with Datasheet "C", which is commercially available as "NP-2" from Du Pont Company's Potomac River Works, Martinsburg, W. Va. The critical temperature prior to detonation of the explosive for the explosive, detonator, and primer was, respectively, about 350° F., 175° F., and 350° F. Because the temperature of the explosive remained below about 350° F. there was no danger of an unplanned detonation.

The assembly was placed into a plywood frame. High temperature fiberglass insulation was installed around the assembly and plywood frame. The insulation prevents air from circulating through the space between the molybdenum and backer plates. A plywood box was placed over the assembly and plywood frame, and then the box was covered with sand in order to minimize the effects upon the environment surrounding the explosion.

A transformer was located approximately 20 feet away from the explosion in a wooden box covered with a sand. The transformer provided 6,000 amps at 5 volts with an input of 220 volts at 136 amps and had a copper "U" ¼ inch thick and 8 inches tall secondary. Six size 4/0 copper wires were used to conduct the 6,000 amps through the stainless steel plate. The resistance of the stainless steel plate caused it to function as an in-situ the heating element. The voltage across the plate was approximately 1.0 to about 1.5 volts.

After heating the molybdenum plate reached a temperature of about 330° F.; whereas the backer plate reached a temperature of about 580° F. Before detonation the maximum temperature of the primer was about 270° F. The temperature of the explosive was about 335° F., thereby reducing the danger of an unplanned detonation.

The explosive was detonated in order to form the composite. The resultant composite was about 99% areally bonded. Ultrasonic testing was performed in accordance with ASTM Method No. A578 for determining the percent bonding of the composite. Microscopic examination was used for determining the extent of cracking, if any, in the composite. Tests were performed on the composite in accordance with ASTM Method No. A263.44T for determining the shear strength. All testing, unless otherwise noted, was carried out before any post bonding treatments.

The shear strength of the composite formed in accordance with Example 1 was about 28,000 psi.

In each of the following Examples 2-6, the assembly shown in FIG. 4 was prepared for explosion bonding in the manner described in Example 1.

EXAMPLE 2

A 13/16 inch thick SA537, Class 2 steel plate, 12 inches by 24 inches was placed on the stainless steel plate in the manner described in Example 1. A molybdenum alloy plate measuring about 12 inches by 24 inches by 1/16 was placed above and in corresponding dimensional alignment, with the stainless steel plate and spaced therefrom a distance of about 0.125 inch by 6 stainless steel tube standoffs arranged as described in Example 1. A dimensionally conforming layer of the above-described explosive having a weight of about 9 pounds per square foot was placed on the outer layer of the molybdenum plate. The detonator and primer were centered on the edge of the shortest dimension of the molybdenum plate and located on top of the explosive.

After the assembly was prepared, the current was initiated. The molybdenum plate was heated to a temperature of about 325° F.; the steel backer plate was at a temperature of about 450° F. The maximum temperature, prior to detonation, obtained by the explosive and primer, respectively, was about 336° F. and 230° F.

After the detonation of the explosive the molybdenum and steel plates were found to be firmly and uniformly bonded together to form a composite measuring about 10×22 inches with about 99% areal bonding. The shear strength of the resultant composite was about 26,000 psi.

EXAMPLE 3

A 13/16 inch thick SA537, Class 2 steel plate, 12 inches by 24 inches was placed on the stainless steel plate in the manner described in Example 1. Above this plate and spaced therefrom a distance of about 0.125 inch by 6 stainless steel tube standoffs arranged as described in Example 1, was placed in corresponding dimensional alignment a 12 inches by 24 inches by 1/16 inch molybdenum/5% rhenium alloy plate. The outer layer of this plate was covered with a layer of masking tape as described in Example 1. A dimensionally conforming layer of the above-described explosive having a weight of about 8 pounds per square foot was placed over the layer of masking tape. The detonation velocity of the explosive was about 2350 meters per second. The detonator and primer were placed on the explosive in accordance with the procedure discussed in Example 1.

After the assembly was prepared, the current was initiated. The molybdenum plate was heated to a temperature of about 330° F. and the steel backer plate was heated to about 481° F. The maximum temperature, respectively for the explosive and primer was about 352° F. and 268° F. when the shot was made.

After the detonation of the explosive the molybdenum and steel plates were found to be firmly and uniformly bonded together to form a composite with 99% bonding. No cracks in trimmed plate, size about 10×22 inches. The shear strength of the resultant composite was about 19,000 psi.

EXAMPLE 4

An approximately 1½ inch thick SA516, Grade 70 steel plate, 24 inches by 60 inches was placed on the stainless steel plate in the manner described in Example 1. Above this plate and spaced therefrom a distance of about 0.200 inch by 12 stainless steel tube standoffs which were arranged in 3 lines and equally spaced, was placed in corresponding dimensional alignment an approximately 24 inches by 60 inches by ⅛ inch Hastelloy B-2 plate. Above the Hastelloy B-2 plate and spaced therefrom a distance of about 0.175 inch by 12 stainless steel tube standoffs which were arranged in 3 lines and equally spaced, was placed in corresponding dimensional alignment an approximately 24 inches by 60 inches by 1/16 inch molybdenum/13% rhenium alloy plate. The outer layer of the molybdenum plate was covered with a layer of masking tape as described in Example 1. A dimensionally conforming layer of the above-described explosive having a weight of about 11 pounds per square foot was placed over the layer of masking tape. The detonator and primer were located on the explosive in the manner discussed in Example 1.

The entire assembly containing the elements in the manner arranged above was heated by a kerosene space heater to a temperature of about 150° F.

After the detonation of the explosive the molybdenum and steel plates and Hastelloy B-2 interlayer were found to be firmly and uniformly bonded together to form a composite with about 95% areal bonding.

EXAMPLE 5

An approximately 1½ inch thick SA516, Grade 70 steel plate, which measured about 22 inches by 60 inches was placed on the stainless steel plate as in the manner described in Example 1. Above this plate and spaced therefrom a distance of about 0.175 inch by 12 stainless steel tube standoffs which were arranged in 3 lines and equally-spaced upon the SA516, Grade 70 steel plate, was placed in corresponding dimensional alignment an approximately 22 inches by 60 inches by ⅛ inch Hastelloy C276 plate. Above the Hastelloy plate and spaced therefrom a distance of about 0.175 inch by 12 stainless steel tube standoffs which were arranged in 3 lines and equally-spaced upon the Hastelloy C276 plate, was placed in corresponding dimensional alignment an approximately 22 inches by 60 inches by 1/16 inch molybdenum/41% rhenium alloy plate. A dimensionally conforming layer of a powdered ANFO-based explosive which had an inert diluent and had a weight of about 8 pounds per square foot and a detonation velocity of about 2600 meters/sec was placed upon the molybdenum/rhenium alloy plate. The detonator and primer were placed on the explosive in the manner discussed in Example 1.

The entire assembly containing the elements discussed above was heated to a temperature of 150° F. using a kerosene space heater.

After the detonation of the explosive, the molybdenum, steel and Hastelloy C276 plates were found to be firmly and uniformly bonded together to form a composite with about 99% areal bonding. The shear strength of the resultant composite was about 22,000 psi.

EXAMPLE 6

A corrosion resistant layer about 0.054 inches thick comprising molybdenum-13% rhenium-10% tungsten was heated to about 300° F. The heated layer was explosion bonded to an intermediate layer comprising copper which was about 0.093 inches thick, that in turn was bonded to a backer layer comprising carbon steel which had a thickness of about 0.750 inches.

EXAMPLE 7

A composite was formed using the assembly illustrated in FIG. 6 and the following method.

An approximately 1 inch thick SA516 Grade 70 steel plate, 12 inches by 24 inches, and spaced therefrom a distance of about 0.150 inch by stainless steel standoffs was placed in corresponding dimensional alignment with an approximately 12 inches by 24 inches by ⅛ inch copper plate. A steel batten strap about 3 inches by 24 inches by 1/16 inch was centered above the copper plate at a standoff distance of about 0.060 inches. The cladding layer was two pieces of low carbon steel plates, each measuring about 6 inches by 24 inches by 1/16 inch, arranged side by side was placed in corresponding dimensional alignment to the copper plate at a standoff distance of about 0.180 therefrom which was maintained by the use of stainless steel standoffs with respect to the cladding plates. Attached with masking tape to the cladding plates was a steel driver plate which measured about 12 inches by 24 inches by 1/16 inches. The driver plate was covered with masking tape on the side next to the cladding plates to prevent the driver plate from becoming bonded to the final composite. There was no substantially no standoff space between the driver plate and layer of cladding plates.

A dimensionally conforming layer of the explosive described in Example 1, having a weight of about 9.5 pounds per square foot was placed over the layer of masking tape. The detonation velocity of the explosive was about 2600 meters per second. The detonator and primer were placed at a center point at an edge of the backer layer along the gap or seam between the two cladding plates.

After the detonation of the explosive the steel backer, steel cladding plates, steel batten strap, and copper interlayer were found to be were found to be firmly and uniformly bonded together, including the seam between the two cladding plates to form a composite with about 95% areal bonding.

EXAMPLE 8

In this Example, the assembly and process described in Example 7 were used with the exception that no batten strap or intermediate layer was employed.

A 24 carat gold sheet about 20 mils thick was explosion bonded using a velocity of about 2300 meters/sec., at room temperature to a 1 inch thick carbon steel backer layer. The gold sheet measured about 3×3 inches and was affixed temporarily to a driver plate by doubled-face tape. The driver plate was about 0.036 inches thick and was spaced approximately 0.135 inches from the backer layer.

Figure 7:
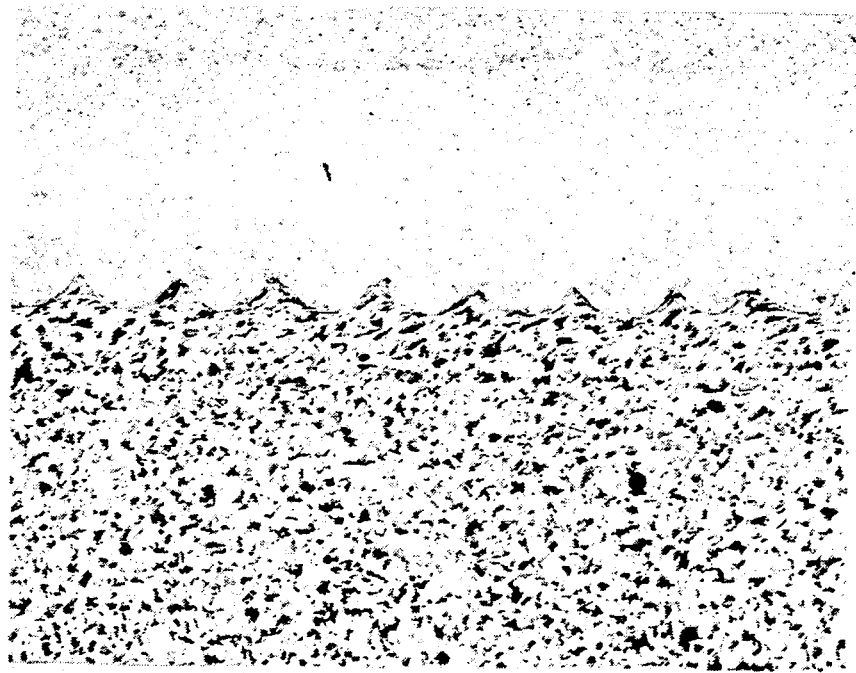
FIG. 7—FIG. 7 is a photomicrograph at 100X magnification of a section of the interface between the cladding and backing layers of a composite formed by Example 8.

FIG. 7 is a photomicrograph at 100 × magnification which shows a section of the interface between the gold and steel layers. The upper lighter-colored region of FIG. 7 corresponds to the gold sheet whereas the lower darker region corresponds to the steel backer. The wavy interface is indicative of the diffusionless metallurgical bond formed by explosion bonding.

EXAMPLE 9

This Example was performed substantially in accordance with Example 8 with the exception that platinum was explosion bonded to a carbon steel backer.

The platinum sheet measured about 3×3 inches and was about 20 mils thick. The carbon steel backer layer was about 1 inch thick.

While a few embodiments of the invention have been described in detail one of ordinary skill would recognize that other embodiments and variations are encompassed by the appended claims.

The following is claimed:

1. A metal composite made by the process comprising:
   providing at least one cladding layer comprising a corrosion resistant metal, having a brittle to ductile transition temperature greater than about 40 F.,
   locating a layer comprising a backer metal adjacent to said at least one cladding layer positioning an intermediate layer between the backer layer and said cladding layer,
   providing an explosive upon the upper surface of said at least one cladding metal,
   heating at least said at least one cladding to a temperature greater than its brittle-to-ductile transition temperature and less than its melting point, without detonating the explosive; and
   detonating said explosive, thereby forming a substantially diffusionless bond between said at least one cladding layer and said backer layer.

2. An explosive bonded metal composite comprising:
   a backer layer;
   a batten strap adjacent to the backer layer;
   at least two corrosion resistant cladding layers parallel to each other and adjacent to said batten strap, an intermediate layer between the backer layer and said batten strap; and
   wherein the seam between said cladding layers is substantially sealed by the batten strap.

3. An explosively bonded metal composite comprising at least one cladding layer comprising a molybdenum rhenium alloy,
   a backer layer, and;
   an intermediate layer located between said alloy and backer layer.

4. The composite of claim 1, 2 or 3 wherein said cladding layer comprises at least one member of the group consisting of molybdenum, molybdenum/rhenium alloys, tungsten and tungsten/rhenium alloys.

5. The composite of claim 1, 2 or 3 wherein said backer layer comprises at least one member of the group consisting of steel, alloy steel, stainless steel, nickel, cooper, aluminum, titanium, and alloys thereof.

6. The composite of claim 1 or 2 further comprising at least one intermediate layer between said cladding and backer layers.

7. The composite of claim 6, wherein said intermediate layer comprises at least one member selected from the group consisting of copper, silver, tantalum, and nickel alloys.

8. The composite of claim 4, wherein said cladding layer comprises a member selected from the group consisting of molybdenum/5% rhenium, molybdenum/13% rhenium, molybdenum/41% rhenium, and molybdenum/13% rhenium/10% tungsten.

9. The composite of claim 2 wherein cladding layers comprise at least one member selected from the group consisting of Mo, W, Re, Ru, Pa, Pt, Au, Ag, and alloys thereof.

10. The composite of claim 3, wherein said intermediate layer comprises at least one member selected from the group consisting of copper, silver, tantalum, and nickel alloys.

11. The composite of claim 1, 2 or 3 comprising at least about 75% areal bonding.

* * * * *